United States Patent Office 3,073,819
Patented Jan. 15, 1963

3,073,819
HYDRAZINE DERIVATIVES
Otto Straub, Bottmingen, and Paul Zeller, Neuallschwil, Switzerland, assignors to Hoffmann-La Roche Inc., Nutley, N.J., a corporation of New Jersey
No Drawing. Filed Apr. 20, 1960, Ser. No. 23,369
Claims priority, application Switzerland Apr. 30, 1959
8 Claims. (Cl. 260—240)

This invention relates to hydrazine derivatives. More particularly, the invention relates to hydrazine derivatives having the following structural formula:

(I) 

wherein $R_1$ represents hydrogen or acyl, $R_2$ represents aralkyl, cycloalkyl or alkyl, $R_3$ represents hydrogen or alkyl and $R_4$ represents pyridyl,
and to salts of such compounds.

The symbol $R_1$ in Formula I, in addition to hydrogen, represents carboxylic acid groups of the aliphatic series, e.g. both lower and higher fatty acid (alkanoyl) groups up to about 18 carbon atoms such as acetyl, propionyl, butyryl, pivaloyl, palmitoyl and the like, cycloalkanoyl groups, preferably containing 4 to 7 carbon atoms such as cyclopropanecarbonyl, cyclobutanecarbonyl, cyclopentanecarbonyl, cyclohexanecarbonyl and the like, monocyclic aromatic acyl groups, e.g. phenyl lower alkanoyl groups such as benzoyl, phenacetyl and the like, as well as heterocyclic acyl groups, preferably nitrogen, sulfur and oxygen-containing, 5–7 membered monoheterocyclic acyl groups such as thenoyl, furoyl, isonicotinoyl, nicotinoyl, picolinoyl, and the like. The acyl groups may also contain substituents such as the halogens, hydroxy and up to 4 carbon atom alkoxy and alkylmercapto groups.

$R_2$ represents e.g. straight or branched chain lower alkyl groups such as methyl, ethyl, propyl, isopropyl, butyl, isobutyl and the like, phenyl lower alkyl groups such as benzyl, and 3 to 6 carbon cycloalkyl groups such as cyclopropyl, cyclobutyl, cyclopentyl and cyclohexyl. $R_3$, in addition to hydrogen, represents lower alkyl groups similar to those represented by $R_2$. $R_4$ represents the 2-, 3- or 4-pyridyl radical.

Representative of the compounds contemplated by this invention are the following:

1-isopropyl-2-(2-pyridyl-methylene)hydrazine
1-isopropyl-2-(3-pyridyl-methylene)hydrazine
1-isopropyl-2-(4-pyridyl-methylene)hydrazine
1-benzyl-2-(4-pyridyl-methylene)hydrazine
1-isopropyl-2-(α-4-pyridyl-ethylidene)hydrazine
1-benzyl-2-(α-4-pyridyl-ethylidene)hydrazine
1-benzoyl-1-isopropyl-2-(4-pyridyl-methylene)hydrazine
1 - (4 - chlorobenzoyl)-1-isopropyl-2-(4-pyridyl-methylene)-hydrazine
1 - (2 - thenoyl)-1-isopropyl-2-(4-pyridyl-methylene)hydrazine
1 - (2 - furoyl)-1-isopropyl-2-(4-pyridyl-methylene)hydrazine
1-pivaloyl-2-(4-pyridyl-methylene)hydrazine
1 - benzoyl-1-isopropyl-2-(2-pyridyl-methylene)hydrazine
1 - p - chlorobenzoyl-1-isopropyl-2-(3-pyridyl-methylene)hydrazine
1 - benzoyl - 1-isopropyl - 2-(α-2-pyridyl-ethylidene)hydrazine
1 - benzoyl - 1 - isopropyl-2-(α-3-pyridyl-ethylidene)hydrazine
1 - pivaloyl - 1 - isopropyl-2-(α-4-pyridyl-ethylidene)hydrazine
1-benzoyl-1-benzyl-2-(2-pyridylmethylene)hydrazine
1 - p - chlorobenzoyl-1-benzyl-2-(4-pyridyl-methylene)hydrazine
1 - pivaloyl - 1 - benzyl-2-(α-4-pyridyl-ethylidene)hydrazine The compounds described above are produced by condensing a compound of the formula (II) 

wherein $R_1$ has the same significance as above and $R_5$ represents hydrogen, aralkyl or up to 7 carbon atom aliphatic or alicyclic groups,
with a carbonyl compound of the formula (III) $R_3$—CO—$R_4$ wherein $R_3$ and $R_4$ have the same significance as in Formula I.

The resulting hydrazone may, if desired, be acylated when $R_1$ represents hydrogen. If $R_5$ represents hydrogen, a group represented by $R_2$ may be introduced into the hydrazone.

In the first stage of the process a hydrazine derivative of Formula II is condensed with an aldehyde or ketone of Formula III, preferably in an inert solvent such as benzene, ethanol, water or the like at room temperature or above.

If a non-acylated compound is obtained in the first stage, the hydrazone may then be acylated in the second stage by means of an acylating agent. Reactive acid derivatives such as acid halides, especially chlorides, esters or anhydrides may be used. Symmetrical acid anhydrides containing two of the same acyl groups or mixed anhydrides, for example, with lower alkanoic acids or carboxylic acid monoesters, may be used.

Free acids may also be used as acylating agents. In that case, the condensation is preferably effected in the presence of an N, N¹-disubstituted carbodiimide. The carbodiimide may be obtained, for example, by treating a disubstituted urea derivative with p-toluenesulfonyl chloride in pyridine. In the condensation reaction the corresponding urea derivatives are reformed. By using preferred substituted carbodiimides, e.g. N,N¹-dicyclohexylacrbodiimide, urea derivatives are obtained as by-products which are readily separated from the desired reaction product. the reaction may be effected at a temperature within the range of 0 to 50° C., preferably at room temperature or slightly above.

When a starting material of Formula II wherein $R_5$ represents hydrogen is used in the first stage, the hydrazone obtained as a result of the condensation with the carbonyl compound is treated with an agent supplying the group $R_2$. The introduction of this substituent occurs upon reaction with a halide of the formula $R_5$-hal in the presence of an alkali metal alcoholate, preferably sodium ethoxide.

The compounds of Formula I form acid addition salts upon reaction with inorganic or organic acids and these salts are also within the scope of the invention. Such salts include mineral acid salts, e.g. hydrohalides like hydrochloride, hydrobromide, hydroiodide, etc., sulfate, nitrate, phosphate and the like, and organic salts, e.g. oxalate, tartrate, citrate, etc.

The products described above are monoamine oxidase inhibitors. They are useful in psychotherapy for treatment of depressed or disturbed states. They are also useful in cases of cachexia. The base or a pharmaceutically acceptable acid addition salt may be administered in conventional dosage forms such as tablets, elixirs, suspensions, injectables and the like.

The following examples are illustrative of the invention. Temperatures are stated in degrees centigrade.

Example 1

5.54 g. of 1-benzoyl-1-isopropylhydrazine were suspended in 15 ml. of 50% aqueous ethanol and treated with a solution of 3.53 g. 4-pyridine aldehyde in 20 ml. of 50% ethanol. The suspension was heated slowly at a temperature slightly under the boiling point, then permitted to cool. After 24 hours, 100 ml. of water were added to the reaction mixture. The aqueous solution was extracted with ether, the ether solution was dried, concentrated, and the residue was crystallized from water-methanol (1:1). The 1-benzoyl-1-isopropyl-2-(4-pyridylmethylene)hydrazine melted at 73–75°.

The starting material, 1-benzoyl-1-isopropylhydrazine, was prepared as follows:

To a solution of 65.6 g. of anhydrous sodium acetate in 1 liter of 50% aqueous ethanol were added 88 g. of isopropylhydrazine hydrochloride and then 84.8 g. of benzaldehyde. The solution which was clear at first soon became turbid. The reaction mixture was agitated for 1 hour, and after standing for a short period of time was then extracted with ether. The ether extract was washed with sodium bicarbonate solution and with water, then dried and concentrated. The oily residue was distilled under high vacuum to obtain 1-isopropyl-2-benzylidenehydrazine, B.P. 80–84°/0.07 mm.

A solution of 14 g. of benzoyl chloride in 25 ml. of absolute benzene was dropped into a solution containing 16.2 g. of 1-isopropyl-2-benzylidenehydrazine in 100 ml. of absolute benzene and 50 ml. of absolute pyridine with the exclusion of moisture. The mixture was heated at 80° for about 2 hours and then concentrated at a temperature of about 40° and a pressure of about 15 mm. The residue was digested with a large quantity of water and the partially solidified product was dried on clay. The product, 1-benzoyl-1-isopropyl-2-benzylidenehydrazine, was crystallized from methanol-water (2:1), M.P. 75.5–77°.

A suspension of 53.2 g. of 1-benzoyl-1-isopropyl-2-benzylidenehydrazine in 300 ml. of water, 100 ml. of ethanol and 10 ml. of glacial acetic acid and 12 g. of 80% hydrazine hydrate were boiled under reflux for 60 hours, then cooled with ice and finally treated with 67 ml. of 3 N hydrochloric acid. The precipitated benzalazine was filtered off under suction. The aqueous filtrate was then treated with 50 ml. of concentrated ammonia solution. This was then concentrated under water vacuum at 40–50° and the residue was taken up in chloroform. The resulting suspension was dried with sodium sulfate, filtered, and the filtrate was evaporated to dryness. The residue was dried over sulfuric acid for 24 hours in vacuo and crystallized from low boiling petroleum ether to obtain 1-benzoyl-1-isopropylhydrazine, M.P. 56–58°.

Example 2

A solution of 82 g. of anhydrous acetate in 220 ml. of water was added to a solution of 110.5 g. of isopropylhydrazine hydrochloride in 150 ml. of water. 101.7 g. of 4-pyridine aldehyde were added dropwise. After stirring for 4 hours at a moderately elevated temperature, the mixture was permitted to stand for several hours and then extracted with ether. The ether extract was washed with sodium bicarbonate and sodium chloride solution, dried and concentrated. The residue was purified by distillation under a high vacuum to obtain 1-isopropyl-2-(4-pyridylmethylene)hydrazine, B.P. 110–113°/0.1 mm., M.P. 61–65°.

To a solution of 98 g. of 1-isopropyl-2-(4-pyridylmethylene)-hydrazine in 600 ml. of absolute benzene and 300 ml. of absolute pyridine was added dropwise a solution of 84.3 g. of benzoyl chloride in 150 ml. of absolute benzene over a period of 1 hour with stirring with the exclusion of moisture. The mixture was then heated to boiling for about 1½ hours. The pyridine and benzene solvents present were distilled off under water vacuum at 40°. The residue was taken up in a large amount of water and the resulting suspension was thoroughly extracted with ether. The ether solution was washed with sodium carbonate and sodium chloride solutions and dried. The ether was then distilled off. The residue was crystallized from water and methanol (2:1) to obtain 1-benzoyl-1-isopropyl-2-(4-pyridylmethylene)hydrazine, M.P. 76.5–77.5°.

Example 3

1-isopropyl-2-(4-pyridylmethylene)hydrazine was treated with acetyl chloride according to the procedure described in Example 2 to obtain 1-acetyl-1-isopropyl-2-(4-pyridylmethylene)hydrazine, M.P. 92.5–95.5° (crystallized from petroleum ether, boiling range 80–105°).

Example 4

1-isopropyl-2-(4-pyridylmethylene)hydrazine was acylated with p-chlorobenzoyl chloride according to the procedure described in Example 2 to obtain 1-(4-chlorobenzoyl)-1-isoproyl-2-(4-pyridylmethylene)hydrazine, M.P. 85–87.5° (crystallized from petroleum ether, boiling range 80–105°).

Example 5

1-isopropyl-2-(4-pyridylmethylene)hydrazine was acylated with 2-thenoyl chloride according to the procedure described in Example 2 to obtain 1-(2-thenoyl)-1-isopropyl-2-(4-pyridylmethylene)hydrazine which was repeatedly precipitated from ethanol-water and then crystallized from petroleum ether, M.P. 79.5–81°.

Example 6

1-isopropyl-2-(4-pyridylmethylene)hydrazine was acylated with isonicotinoyl chloride hydrochloride by the procedure of Example 2 to obtain 1-isonicotinoyl-1-isopropyl-2-(4-pyridyl-methylene)hydrazine, M.P. 108–110° (crystallized from petroleum ether-ethyl acetate, 2:1).

Example 7

A solution of 26.1 g. of 2-furoyl chloride in 50 ml. of absolute benzene was dropped with stirring and exclusion of moisture into a solution of 32.6 g. of 1-isopropyl-2-(4-pyridylmethylene)hydrazine in 200 ml. of absolute benzene and 100 ml. of absolute pyridine. The mixture was gently boiled for 1½ hours and concentrated as much as possible at 40° under water vacuum. The residue was taken up in a small amount of ethanol and stirred with a large amount of ice water. The precipitate which formed was filtered under suction, dissolved in ethanol and reprecipitated by the addition of water, then finally crystallized from water-ethanol (2:1). The 1-2-furoyl)-1-isopropyl-2-(4-pyridylmethylene)-hydrazine melted at 84–85°.

Example 8

1-isopropyl-2-(4-pyridylmethylene)hydrazine was acylated with palmitoyl chloride by the procedure of Example 7 to obtain 1-palmitoyl-1-isoproyl-2-(4-pyridylmethylene)hydrazine which was repeatedly crystallized from a water-ethanol mixture and melted at 50–54°.

We claim:

1. A member selected from the group consisting of compounds of the formula

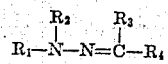

wherein $R_1$ represents a member of the group consisting of alkanoyl of up to 18 carbon atoms, 4 to 7 carbon atom cycloalkanoyl, phenyl lower alkanoyl, thenoyl and furoyl, $R_2$ represents a member of the group consisting of lower alkyl, phenyl lower alkyl and 3 to 6 carbon cycloalkyl, $R_3$ represents a member of the group consisting of hydrogen and lower alkyl, and $R_4$ represents pyridyl, and pharmaceutically acceptable acid addition salts of said compounds.

2. A compound of the formula
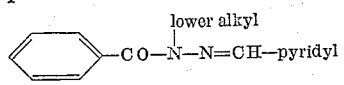
3. A compound of the formula
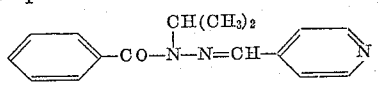
4. A compound of the formula
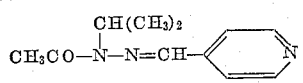
5. A compound of the formula
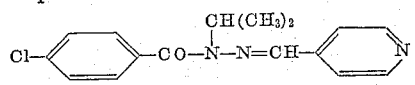
6. A compound of the formula
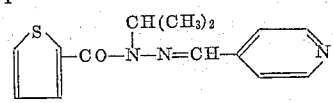
7. A compound of the formula
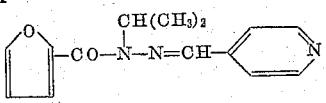
8. A compound of the formula
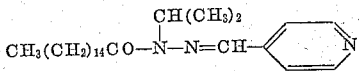
References Cited in the file of this patent
FOREIGN PATENTS
| | | |
|---|---|---|
| 187,112 | Austria | Oct. 25, 1956 |
| 724,699 | Great Britain | Feb. 23, 1955 |
| 729,348 | Great Britain | May 4, 1955 |
| 729,967 | Great Britain | May 11, 1955 |
OTHER REFERENCES
Wiley et al.: J. of Org. Chem., volume 22, pages 204–7 (1957).